United States Patent [19]
Vrouwenvelder

[11] Patent Number: 5,665,400
[45] Date of Patent: Sep. 9, 1997

[54] APPARATUS FOR FORMING A FLAT PIECE OF DOUGH FROM A DOUGH BODY

[75] Inventor: Curinus Cornelis Vrouwenvelder, BA 's-Hertogenbosch, Netherlands

[73] Assignee: Johan Hendrik Bernard Kaak, Gaanderen, Netherlands

[21] Appl. No.: 544,318

[22] Filed: Oct. 17, 1995

[30] Foreign Application Priority Data

Oct. 26, 1994 [NL] Netherlands ............. 94 01776

[51] Int. Cl.⁶ .................................... B29C 47/34
[52] U.S. Cl. ............... 425/145; 425/373; 426/502
[58] Field of Search ............... 425/145, 373; 426/502

[56] References Cited

U.S. PATENT DOCUMENTS

| | | | |
|---|---|---|---|
| 5,088,912 | 2/1992 | Raque et al. | 425/155 |
| 5,118,274 | 6/1992 | Morikawa et al. | 425/140 |
| 5,266,341 | 11/1993 | Morikawa et al. | 426/502 |
| 5,466,143 | 11/1995 | Suzuki et al. | 425/140 |

*Primary Examiner*—Jay H. Woo
*Assistant Examiner*—Iurie A. Schwartz
*Attorney, Agent, or Firm*—Beveridge, DeGrandi, Weilacher & Young, L.L.P.

[57] ABSTRACT

Apparatus for forming a flat piece of dough from a dough body, wherein the dough body is conveyed with a conveying velocity to a roller for flattening by the roller. Before the piece of dough reaches the roller the conveying means is accelerated to a higher conveying speed by adjustable driving means, as a result of which the orientation of the piece of dough vis-à-vis the roller is corrected by the inertia of the piece of dough at the moment the piece of dough strikes the roller.

11 Claims, 1 Drawing Sheet

APPARATUS FOR FORMING A FLAT PIECE OF DOUGH FROM A DOUGH BODY

BACKGROUND OF THE INVENTION

The invention relates to a method for forming a flat piece of dough from a dough body, wherein the dough body is conveyed with a conveying velocity to a roller and is flattened by the roller.

The invention also relates to an apparatus for forming a flat piece of dough from a dough body, which apparatus is provided with a roller for flattening a dough body and a conveying means for conveying the dough body to the roller with a conveying velocity, wherein the conveying means is drivable by driving means.

When manufacturing a dough product, for example baguette or bread for toasting, first of all a flat piece of dough is formed from a dough body which is then rolled up and further processed into the dough product in question. Forming the dough body into a flat piece of dough takes place in that the dough body is conveyed by a conveying means to a roller for flattening the dough body at a conveying velocity which is lesser than or equal to the peripheral velocity of the roller. In practise it has been shown, however, that if the piece of dough which generally has an elongated shape, is placed on the conveying means, the latter is not in all cases parallel with regard to the roller. Moreover, it has been shown that as a result of the difference in friction a dough body is not simultaneously taken along by all parts of the roller, even if the dough body is indeed placed parallel with regard to the roller. Due to this the flat piece of dough acquires a jagged shape, whereby rolling up the flat piece of dough is difficult and a rolled up flat piece of dough is formed which does not have a uniform section but which hangs down at the ends. Due also to the varying orientation of the piece of dough vis-à-vis the roller, a non-reproducible flat piece of dough is formed which leads to non-uniform dough products, such as baguettes and bread for toasting. In addition, it is in many cases necessary to remove the hanging down ends of the rolled up flat piece of dough, which leads to high wastage. Because the rolled up flat piece of dough has no uniform diameter it is impossible to divide elongated rolled up pieces of dough into several equal pieces for forming small baguettes, for example.

It is, among other things, an object of the present invention to provide a method and an apparatus for forming a flat piece of dough from a dough body which enables forming a correctly positioned, almost rectangular flat piece of dough, thus furthering the production of reproducible dough products and in the course of which rolling up of the flat piece of dough is also facilitated, and in which the rolled up flat piece of dough acquires an almost uniform diameter whereby no head waste occurs and the rolled up flat piece of dough can be divided into several equal pieces.

SUMMARY OF THE INVENTION

This invention relates to apparatus for forming a flat piece of dough from a discrete dough body. Apparatus according to the invention includes a first dough conveying means for conveying the discrete dough body, driving means for driving the first dough conveying means, a roller near the downstream end of the first dough conveying means for applying pressure to the discrete dough body to form it into a flat piece of dough, a sensor for detecting the presence of a discrete dough body on the conveying means at a predetermined distance upstream of the roller, and a further dough conveying means for conveying the flat piece of dough downstream of the first dough conveying means. In one respect, the invention includes such a drive means which conveys the dough body to the predetermined distance upstream of the roller at a conveying velocity and then conveys the dough body from the predetermined distance upstream of the roller to the roller at an accelerated velocity which is greater than the conveying velocity, whereby the discrete dough body is oriented by its contact with the roller at the accelerated velocity. According to another aspect of the invention, the roller is driven so it has a peripheral velocity, and the driving means drives the first dough conveying means to convey the dough body to the predetermined distance upstream of the roller at a first conveying velocity which is no greater than the peripheral velocity of the roller, and then conveys the dough body from the predetermined distance upstream of the roller to the roller at an accelerated velocity which is greater than the peripheral velocity of the roller.

Preferably, the roller is downstream of the first dough conveying means, the apparatus has means for detecting contact between the dough body and the roller, and the driving means is adjusted, in response to contact between the dough body and the roller, to drive the first dough conveying means at the conveying velocity. The roller is disposed in opposition to the further dough conveying means so that the dough is flattened between the roller and the further dough conveying means.

If the apparatus is provided with detection means for detecting contact between the dough body and the roller, it is possible to adjust the driving means to a lower velocity after the piece of dough contacts the roller, so that flattening by the roller is not negatively effected.

If the conveying means is a slipping conveying means then undesired forces which are exerted on the conveying means when the piece of dough strikes the roller, are avoided.

BRIEF DESCRIPTION OF THE DRAWINGS

Some embodiments of an apparatus according to the invention will now be described on the basis of the drawing, in which.

DESCRIPTION OF THE PREFERRED EMBODIMENTS

Figure 1:
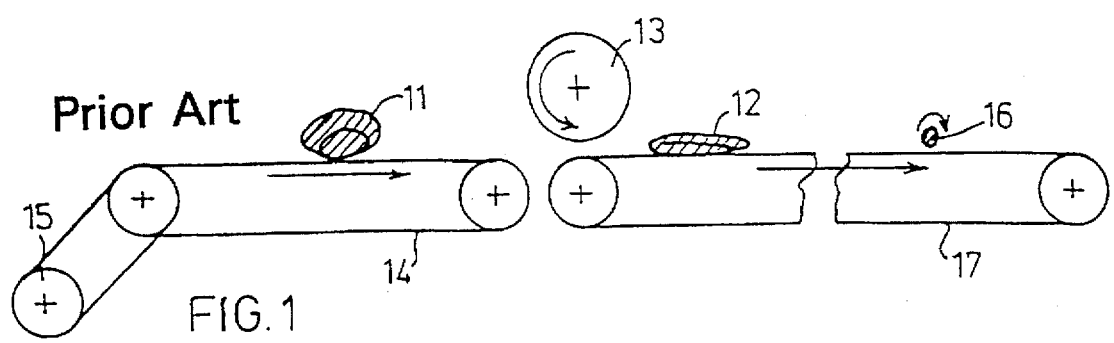
FIG. 1 shows an apparatus for forming a flat piece of dough from a dough body in longitudinal cross section.

In FIG. 1 an apparatus for forming a flat piece of dough 12 from a dough body 11 is schematically shown. The apparatus is provided with a roller 13 for flattening a piece of dough 11 and a conveying means 14 for conveying the piece of dough 11 at a conveying velocity to the roller 13. The conveying means 14 is drivable by driving means 15. The transport means 14 which is made of, for example, a conveyor belt or a roller conveyor, conveys the piece of dough 11 at a velocity which is lesser than the peripheral velocity of the roller 13 to the roller 13. Having arrived at the roller 13, the piece of dough 11 is flattened between the roller 13 and a further conveying means 17 into the flat piece of dough 12 and conveyed further for subsequent processing. Such a subsequent processing can, for example, comprise rolling up of the flat piece of dough 12 by a roll up means 16. It is remarked here that also flattening a piece of dough between two rollers spaced at a small distance from each other can take place with a further conveying means placed behind there.

Figure 2:
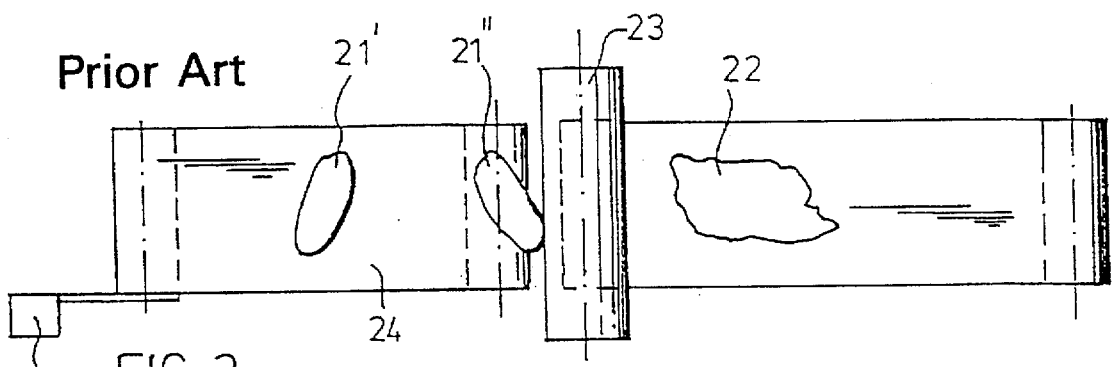
FIG. 2 shows a top view of FIG. 1 with a number of pieces of dough, in which the known method is shown.

In FIG. 2 a top view of FIG. 1 is shown, in which the known method is applied. Here two pieces of dough 21', 21" are located on the conveying means 24 which is driven by the driving means 25 with a constant velocity which is lesser than or equal to the peripheral velocity of the roller 23. In practise, the pieces of dough 21' and 21" do not always seem to be placed parallel to the roller 23 on the conveying means 24, but have, up to a point, an arbitrary orientation.

As a result it happens that a piece of dough, for example 21" passes under the roller 23 out of alignment, resulting in a jaggedly shaped flat piece of dough 22. This is increased in that the friction between the roller and the dough is not constant over the whole roller so that the dough is not passed along simultaneously through the roller. A suchlike jaggedly shaped flat piece of dough 22 is not only difficult to roll up but also gives a non-reproducible end product, also because of the arbitrary orientation. In addition the rolled up flat piece of dough does not have a uniform diameter which leads to head waste and whereby it is impossible to divide a rectangular rolled up flat piece of dough in several equal pieces.

Figure 3:
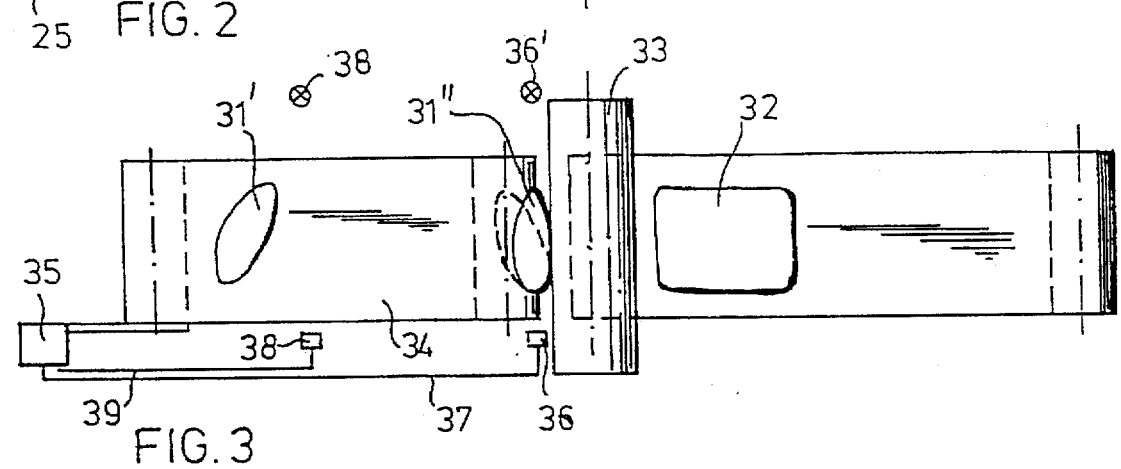
FIG. 3 shows a view which is analogous to FIG. 2, in which the method according to the invention is applied, and FIG. 4 schematically shows the shapes of the dough in certain stages of the manufacture of a product.

According to the invention these disadvantages are avoided by providing the apparatus with driving means which can be adjusted to accelerating the conveying velocity of the conveying means during the conveying of the dough body to the roller. A suchlike apparatus according to the invention is shown schematically in top view in FIG. 3. Herein pieces of dough 31' and 31" are located on a conveying means 34, which is drivable by adjustable driving means 35 at varying conveying velocities. The apparatus further comprises detection means 36 and 36' for detecting contact between the piece of dough and the roller 33'. The detection means further comprise sensors 38, 38' for detecting whether a piece of dough is located at a predetermined distance in front of the roller 33. If the sensors 38, 38' detect that a piece of dough is located in between them, which is shown by connection 39 on the driving means 35, the driving means 35 accelerates the piece of dough from a first velocity, which is lesser than or equal to the peripheral velocity of the roller 33, to a second velocity, which is greater than the peripheral velocity. Thus the piece of dough has a higher velocity on the part of the conveying means between the position of the sensors 38, 38'. If the piece of dough, the piece of dough 31" in FIG. 3 shown by the discontinuous lines, hits the roller 33, then as a result of its inertia, the piece of dough 31" will come to be situated parallel with regard to the roller 33, as shown by the continuous lines. Thus the orientation of the pieces of dough is corrected by the acceleration of the conveying velocity. Moreover, because of this an at least almost constant friction between the roller and the dough is acquired. If the detection means 36, 36' detect that the piece of dough 31" touches the roller, then the driving means are immediately adjusted to a first low velocity through the connection 37 so as not to negatively effect the flattening by the roller. In order to avoid undesired forces being transmitted to the conveying means 34 during the striking of the piece of dough against the roller, the conveying means 34 is preferably a slipping conveying means.

Thus a reproducibly oriented flat piece of dough 32 is acquired by the apparatus and method according to the invention which can be reproducibly further processed in a simple way.

Figure 4:
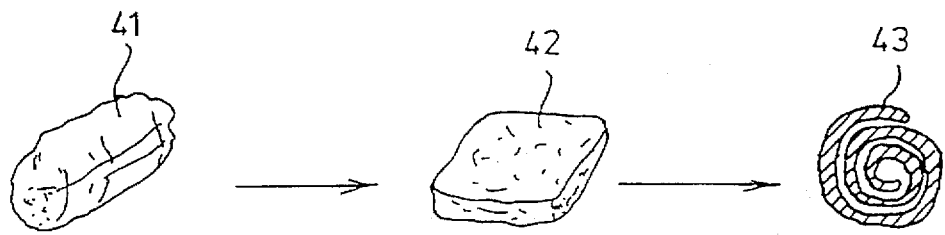

Thus according to the invention a piece of dough 41 can be formed to a flat piece of dough 42 having a reproducibly oriented shape, which flat piece of dough 42 is easy to roll up into a rolled up piece of dough 43 with a uniform diameter, such as is schematically shown in FIG. 4. In this way dough products can be manufactured reproducibly.

I claim:

1. Apparatus for forming a flat piece of dough from a discrete dough body, said apparatus comprising:

a first dough conveying means for conveying the discrete dough body, said first dough conveying means having a downstream end;

a roller for applying pressure to the discrete dough body for forming it into a flat piece of dough, said roller being disposed near the downstream end of the first dough conveying means, a sensor for detecting the presence of a discrete dough body on the conveying means at a predetermined distance upstream of the roller;

a further dough conveying means for conveying the flat piece of dough, said further dough conveying means being positioned in series with and downstream of the first dough conveying means; and driving means for driving the first dough conveying means to convey the dough body to said predetermined distance upstream of the roller at a conveying velocity and then to convey the discrete dough body from said predetermined distance upstream of the roller to the roller at an accelerated velocity which is greater than said conveying velocity whereby the discrete dough body is oriented by its contact with the roller at said accelerated velocity.

2. Apparatus according to claim 1 wherein said apparatus further comprises detection means for detecting contact between the dough body and the roller.

3. Apparatus according to claim 1 wherein the driving means is adjusted, in response to contact between the dough body and the roller, to drive the first dough conveying means at said conveying velocity.

4. Apparatus according to claim 1 wherein the roller is downstream of the first dough conveying means.

5. Apparatus according to claim 1 wherein the roller is disposed in opposition to said further dough conveying means so that the dough is flattened between the roller and the further dough conveying means.

6. Apparatus according to claim 1 having drive means for driving the roller so that said roller has a peripheral velocity, said accelerated velocity of the first dough conveying means being greater than said peripheral velocity of said roller.

7. Apparatus for forming a flat piece of dough from a discrete dough body, said apparatus comprising:

a first dough conveying means for conveying the discrete dough body, said first dough conveying means having a downstream end;

a driven roller for applying pressure to the dough for forming it into a flat piece of dough, said roller being disposed near the downstream end of the first dough conveying means, said roller having a peripheral velocity;

a sensor for detecting the presence of a discrete dough body on the first dough conveying means at a predetermined distance upstream of the roller;

a further dough conveying means for conveying the flat piece of dough, said further dough conveying means being positioned in series with and downstream of the first dough conveying means; and, driving means for driving the first dough conveying means to convey the dough body to said predetermined distance upstream of the roller at a first conveying velocity which is no greater than said peripheral velocity of the roller and then to convey the dough body from said predetermined distance upstream of the roller to the roller at an accelerated velocity which is greater than said peripheral velocity of the roller.

8. Apparatus according to claim 7 wherein said apparatus further comprises detection means for detecting contact between the dough body and the roller.

9. Apparatus according to claim 7 wherein the driving means is adjusted, in response to contact between the dough body and the roller, to drive the first dough conveying means at said conveying velocity.

10. Apparatus according to claim 7 wherein the roller is downstream of the first dough conveying means.

11. Apparatus according to claim 7 wherein the roller is disposed in opposition to said further dough conveying means so that the dough is flattened between the roller and the further dough conveying means.

* * * * *